(12) United States Patent
Van Romer

(10) Patent No.: US 7,374,062 B2
(45) Date of Patent: May 20, 2008

(54) MODULAR SPILL CONTAINMENT SYSTEM

(76) Inventor: Edward W. Van Romer, P.O. Box 687, Sandy Spring, SC (US) 29677

(*) Notice: Subject to any disclaimer, the term of this patent is extended or adjusted under 35 U.S.C. 154(b) by 624 days.

(21) Appl. No.: 11/096,587

(22) Filed: Apr. 1, 2005

(65) Prior Publication Data

US 2006/0219721 A1    Oct. 5, 2006

(51) Int. Cl.
- B65D 1/34    (2006.01)
- B65D 6/22    (2006.01)
- B65D 6/26    (2006.01)
- B65D 6/34    (2006.01)
- B67D 5/60    (2006.01)
- E02B 5/00    (2006.01)

(52) U.S. Cl. .............. 220/571; 137/313; 405/120; 405/122; 220/666; 220/4.28

(58) Field of Classification Search ........ 137/312–314; 220/4.28, 4.33, 475, 480, 481, 571.1, 571, 220/573, 666, 668, 677, 9.1–9.3, DIG. 25; 383/38, 39; 405/114, 119–123
See application file for complete search history.

(56) References Cited

U.S. PATENT DOCUMENTS

| | | | |
|---|---|---|---|
| 3,658,101 A | | 4/1972 | Waldron |
| 3,712,330 A | | 1/1973 | Davis |
| 4,954,015 A | * | 9/1990 | McGowan ............. 405/121 |
| 4,968,179 A | | 11/1990 | Frahm |
| 5,038,528 A | * | 8/1991 | Brant ...................... 52/11 |
| 5,261,773 A | | 11/1993 | Thomas |
| 5,316,175 A | * | 5/1994 | Van Romer ............ 220/573 |
| 5,501,547 A | * | 3/1996 | Mantelli ................. 405/121 |
| 5,687,510 A | * | 11/1997 | Basista .................... 52/11 |
| 5,735,638 A | * | 4/1998 | Beamer .................. 405/119 |
| 5,762,233 A | * | 6/1998 | Van Romer ............ 220/573 |
| 5,820,297 A | | 10/1998 | Middleton |
| 5,924,461 A | * | 7/1999 | Shaw et al. .............. 141/86 |
| 6,019,243 A | * | 2/2000 | Marino ................... 220/573 |
| 6,692,186 B1 | * | 2/2004 | Suazo et al. ............ 405/36 |
| 6,695,534 B2 | * | 2/2004 | Cain et al. .............. 405/52 |
| 6,880,720 B2 | * | 4/2005 | Van Romer ............ 220/573 |
| 6,880,721 B1 | * | 4/2005 | Barrett et al. ........... 220/573 |
| 6,939,081 B1 | * | 9/2005 | Gropp .................... 405/53 |
| 2004/0169041 A1 | * | 9/2004 | Van Romer ............ 220/573 |

* cited by examiner

*Primary Examiner*—Anthony Stashick
*Assistant Examiner*—Ned A Walker
(74) *Attorney, Agent, or Firm*—McNair Law Firm, P.A.

(57) ABSTRACT

A modular fluid containment system formed of a plurality of fluid containment units and interconnecting channels. The containment units and channels may be comprised of panel units made of flexible non-porous material.

The system includes brace members along selected edges of the containment units and panel units which are operative between an operative position in which the edges of the flexible material forming the containment units and panel units are held in an upright position forming side walls defining a containment or channel area and an inoperative position in which the flexible material is allowed to lie along a single plane in flat or folded condition. Connectors are provided along selected edges of the panel units to interconnect the panel units into desired configurations forming the containment system of desired shape and size.

10 Claims, 6 Drawing Sheets

US 7,374,062 B2

MODULAR SPILL CONTAINMENT SYSTEM

BACKGROUND OF THE INVENTION

Portable spill containment units are well known. They are used primarily to contain contaminants which may be spilled during re-fueling and maintenance of vehicles, particularly in the field.

Containment units are used in any environment in which a contaminant may be spilled, to prevent that contaminant from fouling the soil and water systems.

Several known containment units are taught in the cited patents to Van Romer, the disclosures of which are incorporated with the instant disclosure. There has become a need to provide a multiple containment system which is capable of being displaced over large areas with the individual containment units being inter-connected. Accordingly, it is an object of this invention to provide a containment system which includes a plurality of containment units which may be located in displaced positions and be inter-connected with panel units forming an inter-connected unitary system.

Another object of the invention is that the units are formed of impervious flexible material to facilitate both storage, transport and the ability to conform with the topography on which they may be used.

Another object of the invention is the use of connectors formed with each unit and adapted to be inter-connectable so that desired units may be inter-connected into an impervious containment of desired shape.

Another object of the invention is the provision of multi-shaped panel units which may be inter-connected forming impervious channel members of desired shapes.

Another object of the invention is a lightweight containment system.

Another object of the invention is the provision of connectors which are reliable and may be inter-connected and disconnected with ease.

Another object of the invention is a lightweight modular system composed of modular units each of which is adapted to be positioned into active and inactive positions.

SUMMARY OF THE INVENTION

The instant invention is directed to a modular fluid containment system which is lightweight and formed of flexible material for ease of transport and setup. The system includes a plurality of fluid containment units, a plurality of panel units and connectors which inter-connect the units.

The containment units include a base which is connected about its outer edges with walls. The outer edges of the walls have secured therewith brace members which are positionable between an operative position and an inoperative position. In the operative position, the braces elevate and hold the wall portions in an elevated position creating the inner area of the containment. In the operative position, the braces lie flat allowing the wall portion to line substantially parallel with the base portion. In this position, the containment unit may be folded for storage or shipment.

The panel units comprise a base having a plurality of sides to which selected ones of which braces are connected. The braces act to position these sides in an operative position in which they are elevated forming substantially vertical side walls and an inoperative position in which they lie flat and parallel with the base. The panel units may be folded for storage or transport in the inoperative position.

The panel units may be inter-connected to form containment units or to form elongated channel members.

A channel shaped opening is formed in a selected side of the containment members. The channel opening extends from the outer edges of the wall members to the base. A connector is secured about the edge of the channel openings. A connector is also secured along opposed or selected edges of each panel unit. The connectors are operative to inter-engage panel units with panel units forming channel units or containment units. Also unitary containment units may be connected with panel units, as desired. The connected units form an impervious system of desired configurations.

The panel units may be shaped in a generally rectangular configuration which forms a generally linear channel unit. The panel units may be T-shaped, Y-shaped or of other desired configurations to form channels of desired shapes.

The invention is also directed to a panel unit for use in forming containment systems of selected shape. The panel consists of a flexible non-porous sheet of predetermined length and width which has a connector arranged along selected opposed edges. The connectors are constructed to releasably inter-connect panel units.

Collapsible braces are arranged along opposed edges of the panel which are operative between operative positions and inoperative positions. In the operative positions, opposed edges of the panel are vertically elevated to form the panel into a channel. In the operative position, the panel unit may be folded into a generally flat storage and transport configuration.

The connectors may comprise half sections of a zip lock closure. There may be a slide for inter-engaging closures of adjacent panels.

The panel units are preferably rectangular in shape. They also may be Y-shaped or T-shaped. The panel unit is preferably nonporous, formed of a coated textile fabric.

DESCRIPTION OF A PREFERRED EMBODIMENT

Figure 1:
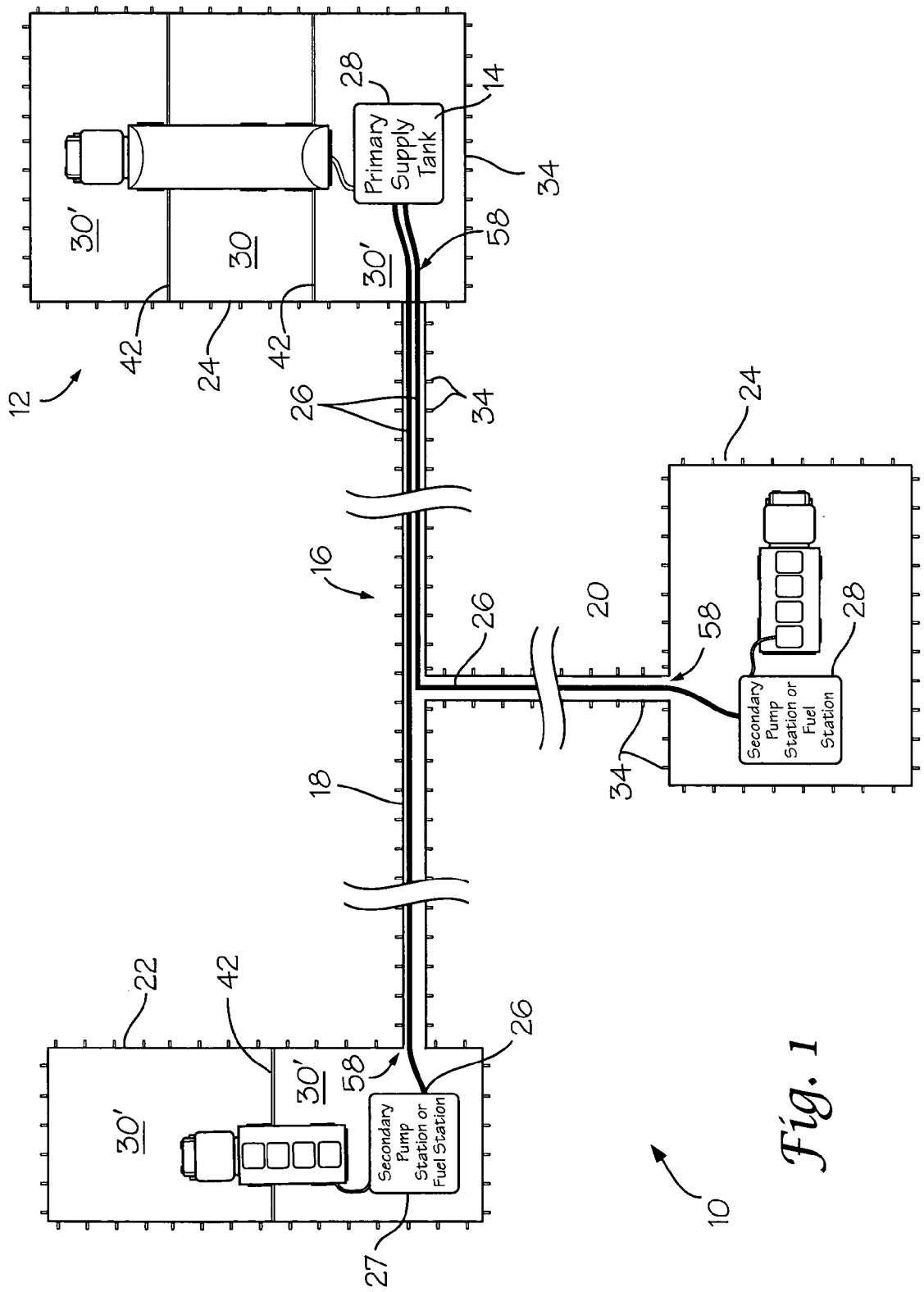
FIG. 1 is a diagrammatic view of the modular system of the invention arranged over an extended area.

Referring now to the drawings, the invention will now be described in more detail.

The modular containment system of the invention which acts to prevent environmentally hazardous spills has as primary functions ease of storage, ease of transportation and ease of assembly. The systems find use in both the commercial and the military market. Generally, the systems find use when a temporary containment system is necessary for use in non-permanent areas.

Normally, the various components for forming the system to be disclosed are in storage, in folded condition, awaiting a need to arise. When that occurs, the individual units are normally loaded onto vehicular transport means and moved to the designated area. That the individual panel units are relatively small requires only one or two people to load, unload and assemble the containment into a containment unit of desired size and shape.

A unique containment system is shown in FIG. 1 which has been constructed of panel units of the instant invention which are of various shapes and sizes. The containment system shown provides for containment protection for a fueling zone which includes a pair of delivery zones, a supply zone and delivery line protection.

Turning now to FIG. 1, there is shown a diagrammatic sketch of a modular arrangement or system of the invention identified as 10. Modular system 10 includes a first or primary containment 12 which is generally rectangular and may be of the general construction shown in U.S. Pat. Nos. 5,316,175 and 5,762,233 to Van Romer. While configured as disclosed in the Van Romer patents, containment unit 12 may be constructed of a plurality of panel members 34 of the type better shown in FIGS. 2a and 2b which will be later described. Containment unit 12 includes a primary fluid supply reservoir 14 which may be replenished by a tanker vehicle as is shown. Containment unit 12 has connected therewith a channel 16 which forms secondary channels 18 and 20 which extend in diverging directions. Each secondary channel connects with secondary containment units 22, 24 which are located at fluid or delivery locations. A fluid delivery reservoir 27, 28 is located within each containment unit 22, 24. Flexible hoses 26 are inter-connected with reservoirs 14, 27 and 28, and are positioned within channels 16, 18 and 20 to deliver fluid from the supply reservoir 14 to the delivery reservoirs 27, 28 as needed.

The delivery reservoirs 27, 28 include delivery equipment, usually spouts or nozzles controlled by on/off valves, which act to deliver the fluid to the desired recipient such as vehicles, drums or other type units.

It is noted that the particular containment structure selected is optimal. Primarily, it must be constructed of impervious flexible material such as textile fabric coated with a suitable polymeric material which resists chemical degradation and remains flexible. It is preferred that suitable brace members be connected with the edges of the containment forming material. The brace members, in an operative position, act to raise the edges forming walls defining the containment area, and in an inoperative position act to allow the sides to lie substantially flat and capable of being folded for shipping. Van Romer U.S. Pat. No. 5,316,175 and No. 5,762,233 are referenced to more fully describe the structure and operation of suitable brace members for use with both the containment units and the panel units.

Figure 2A:
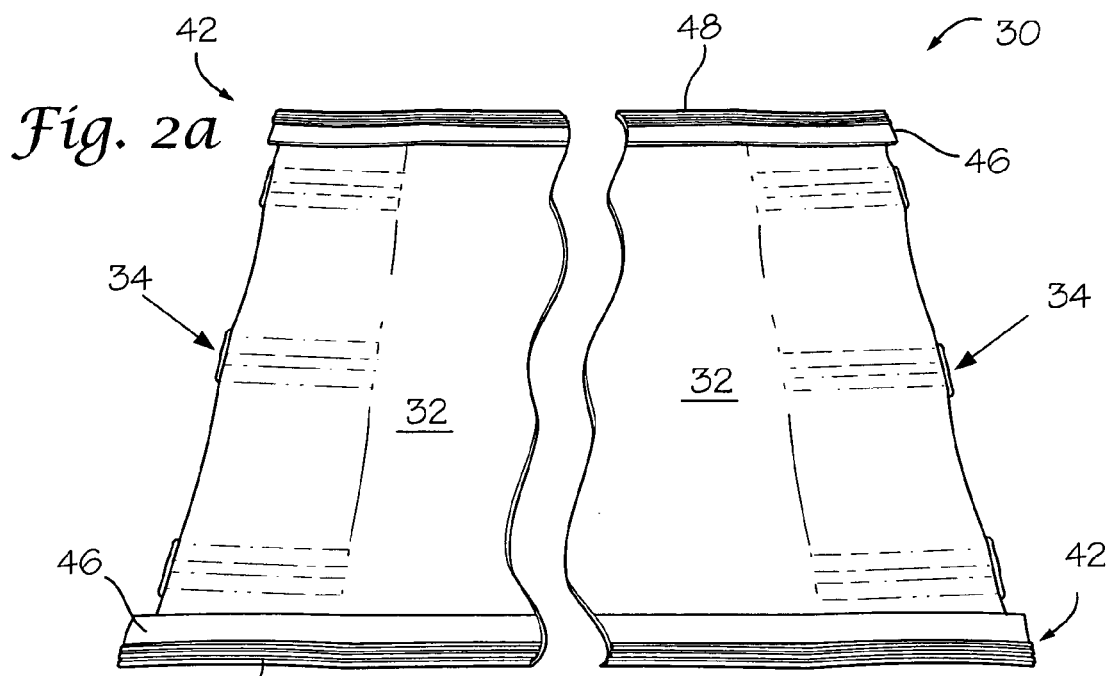
FIG. 2a is a perspective view of a panel member in a flat laid out position.
Figure 2B:
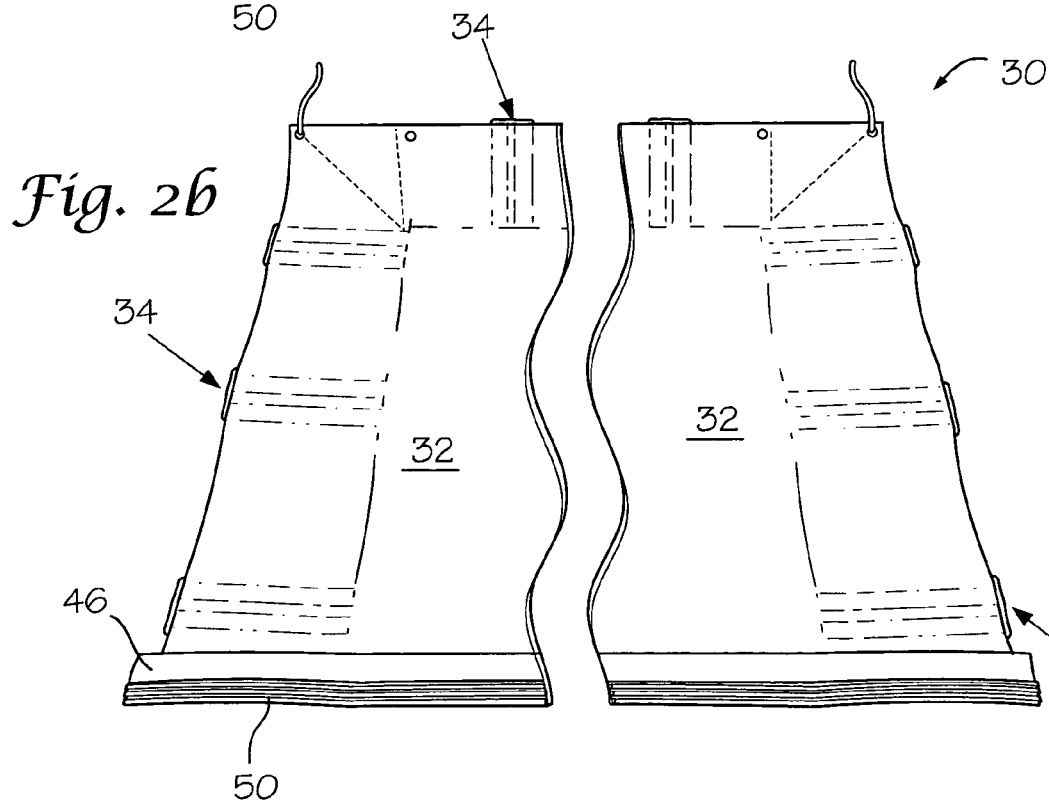
FIG. 2b is a perspective view similar to FIG. 1 showing another arrangement of the panel member.

The containment units may be of one piece construction as disclosed in the above referred to Van Romer patents and as illustrated with containment unit 24 in FIG. 1. Conversely, the containment units may be constructed of a plurality of individual flexible sheets as shown in FIGS. 2a and 2b and illustrated as containment units 12 and 22 in FIG. 1. The constructed unit is essentially as disclosed in the above referred to Van Romer patents, the primary exception being that each unit comprises a plurality of panel units 30, 30$^1$ as shown in FIGS. 2a and 2b.

Figure 3:
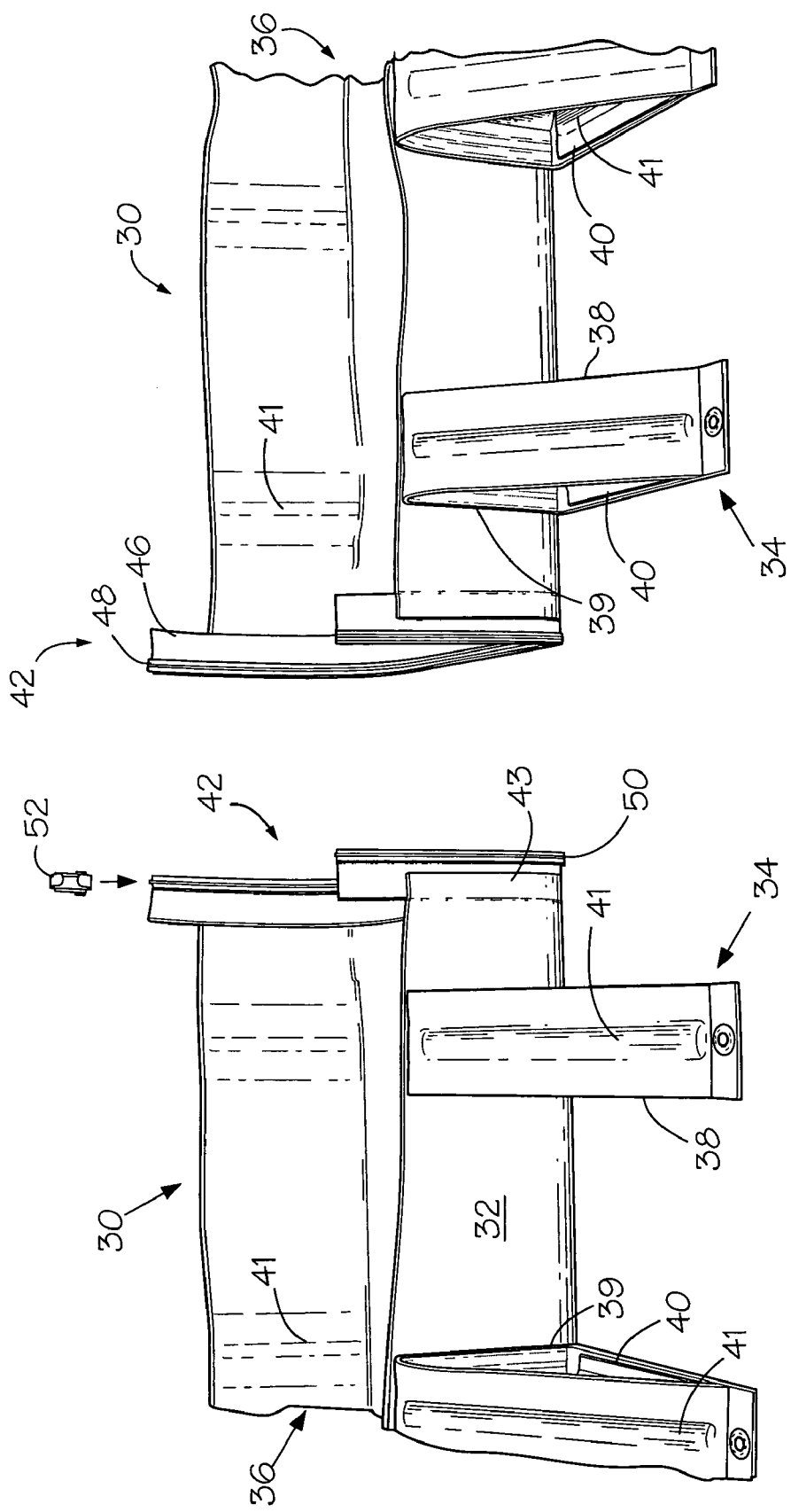
FIG. 3 is a cutaway perspective view of a pair of panel members positioned in the channel position with connectors on adjacent ends.
Figure 4:
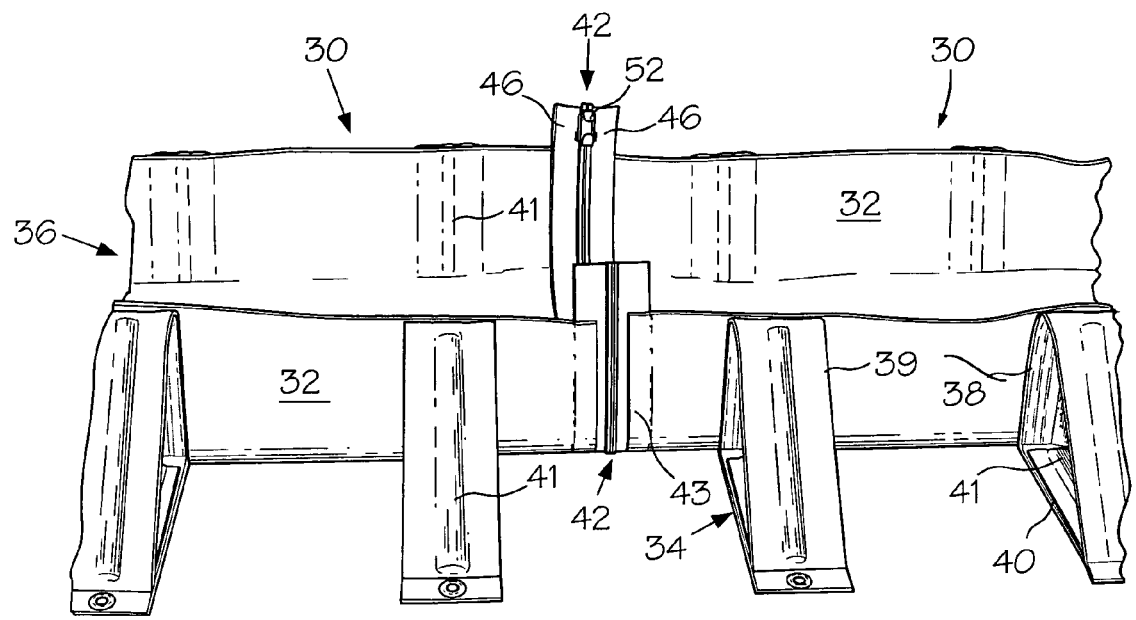
FIG. 4 is a cutaway perspective view similar to FIG. 3 with the opposed ends of the panel sections inter-connected.
Figure 5:
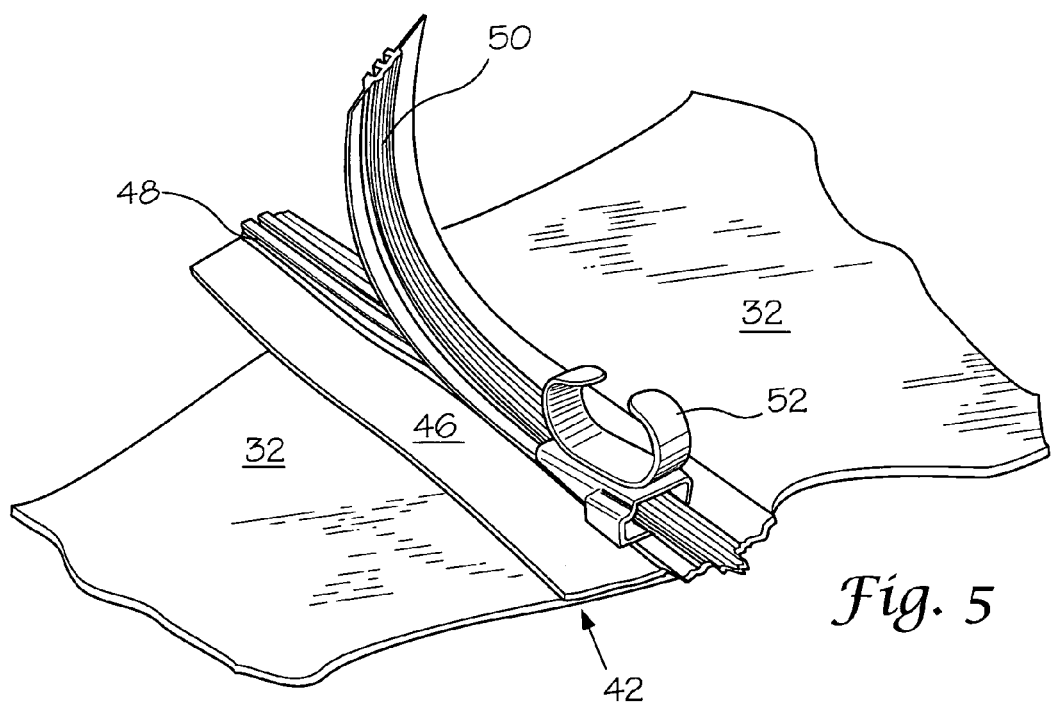
FIG. 5 is an exploded view of the connector.

Turning now to FIGS. 2-4, a rectangular panel unit 30 or 30$^1$ comprising an impervious flexible sheet 32 of a desired length and width, generally about 4'×6' is shown in its flat or inoperative position. Selected edges of sheet 32 have fixed thereto braces 34 which function between a first operative position as shown in FIG. 4 and a second inoperative position as shown in FIGS. 2a and 2b. In the inoperative position braces 34 allow the edges, to which they are engaged, to lie flat which also allows the entire sheet 32 to lie along substantially a single plane. From this inoperative position, panel units 30 may be folded into desired compact sizes for storage and shipping. In the operative position, braces 34 hold the associated edges in a vertical position forming sidewall.

Panels 32 are preferably formed of a textile fabric coated with polyurethane or other polymeric material suitably resistant to decomposition due to reaction with the contained fluid. An extruded synthetic sheet, which satisfies the above stated requirements, may also be utilized.

Braces 34 generally comprise a plurality of inter-connected legs 38, 39 and 40 each with a rigid bar 41. The bars inter-engage in the operative position of brace 34 to maintain the outer edges raised, as shown in FIGS. 3 and 4, and disengage into a stacked position in which the braces lie flat, as shown in FIG. 2, when brace 34 is in the operative position.

Secured along selected outer edges 43 of each panel member is a securing member 42. Each securing member includes a sheet 46 which includes either a tongue element 48 or a groove element 50. Sheets 46 are attached to edges 43 preferably by heat welding normally with a tongue element 48 along one edge and a groove element 50 along the opposite edge of each panel unit 30.

The edges selected for being engaged with a tongue and groove connector 48, 50 or with brace members 34 may vary depending upon the end use. For example, FIG. 2b shows an arrangement in which braches 34 are provided along three edges and the securing element 42 only along a single edge. This construction is utilized to form containment unit 22 and the end portions of containment unit 12. FIG. 2a shows braces and connectors along opposed edges. This arrangement forms channels 16 and panel 39 of containment unit 12. Other arrangements are obviously possible, for example, securing members 42 could be provided along three or four edges of a flexible sheet 32 as necessary.

The advantage of utilizing panel units when forming large containment units is weight. Each panel unit is relatively light and can be handled and assembled by a single person. A unitary large containment unit as shown at 24 in FIG. 1 is of considerable weight which cannot easily be handled by a single person. Also, it requires a greater storage area.

A control element 52 may be employed to engage or separate tongue and groove elements 48, 50 in known manner. Preferably a plurality of tongue and groove elements are provided with each sheet 46 to provide a stronger and more secure engagement between panels 30.

While securing elements as described are well known, it is not known to use them in the disclosed environment. Also, other types of uniting members may be used to engage the adjacent panel units or the panel units with the containment units so long as an impervious connection between the units is created.

Figure 6:
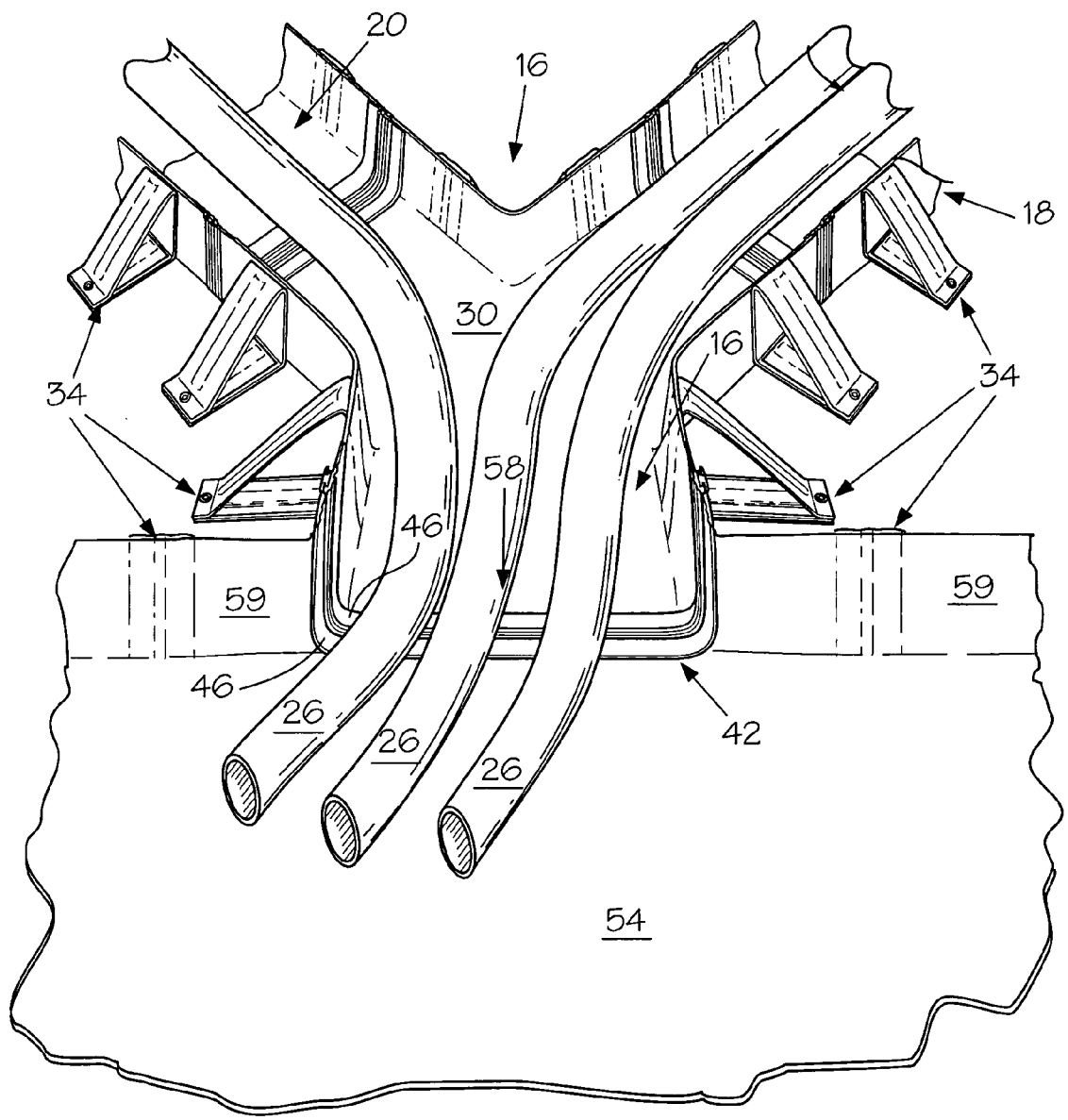
FIG. 6 is a cutaway perspective view of a Y-shaped panel member connected with a containment unit and with a pair of rectangular panel units.
Figure 7:
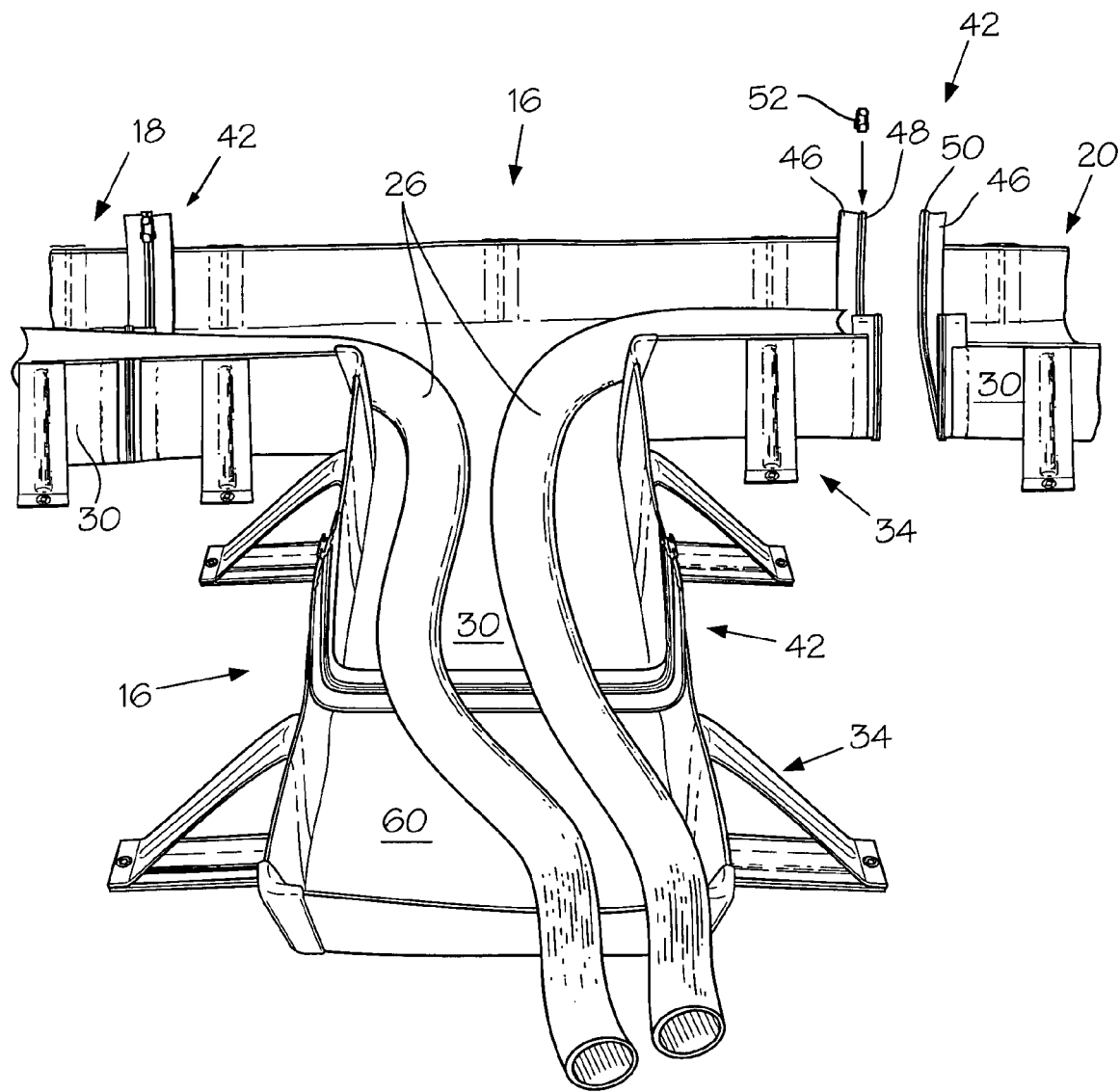
FIG. 7 is similar to FIG. 5 showing a T-shaped panel member inter-related with rectangular panel units.

Turning now to FIGS. 1, 6 and 7, containment units 12, 22 and 24, as earlier stated, may be constructed as described in the referred to Van Romer patents, U.S. Pat. No. 5,316,175 and No. 5,762,233 or be similarly constructed utilizing a plurality of panel units. The requirement for the instant containment system is that they must be of sufficient size to house the fluid reservoirs 14, 27 and 28 and preferably, the vehicles or other equipment delivering fluid to the supply reservoir and receiving fluid from the delivery reservoirs.

Containment units 12, 22 and 24 are constructed preferably of flexible laminated or coated fabric. Any coating is suitable so long as it has a high resistance to chemical degradation. A suitable coating is polyurethane. The fabric must be sufficiently flexible to be folded into compact units for storage and shipping and of sufficient strength to resist tearing. The fabric may be of woven or knitted polyurethane yarns or yarns of other suitable material.

Compartment units 12, 22 and 24 are constructed with braces 34 connected with outer edges 43 of a flexible sheet 32. Braces 34, as earlier stated, function between an elevated operative position and a down inoperative position. In the up, operative position the edges of sheet 54 forming the containment unit are elevated forming side walls for containing fluid and in the down position, the sheet is flat or lies along a single plane and may be folded into a compact bundle for storage and shipment.

As best seen in FIG. 6, a selected edge of each containment unit 12, 22, 24 may be cut away, forming a generally U-shaped opening 58 in the selected side wall 59. Sheet 46 of securing member 42 is secured with the edge defining opening 58. A mating securing member 46 is secured with a channel forming panel unit 30 which connects with the securing unit associated with opening 58 forming a connection between channel 16 with the containment unit. The arrangement shown in FIG. 6 comprises a containment unit connected with a Y-shaped panel unit 30 forming a primary channel 16 and two secondary channels 18 and 20. Hoses 26, which are connected with a reservoir (not shown) within the containment, extend through channels 16, 18 and 20 to designated destinations.

The modular containment system as described protects for spills in the primary reservoir area, the secondary reservoir areas and along the path of delivery hoses 26 between those areas.

An additional arrangement, as shown in FIG. 7, comprises a T-shaped channel 16 fitted with closure member 60. Closure member 60 is a small, generally flat, piece of flexible material to which a securing member 42 is attached about an outer edge. The securing member 42 connected with an end of panel 30 is connected with closure 60 sealing an end of channel 16. The opposing ends of channel 16 are connected with panel units 30 forming secondary channels 18 and 20.

The above described arrangement is positioned adjacent a primary containment such as disclosed in the Van Romer patents with closure 60 adjacent an elevated side of the containment. The hoses 26 pass from the storage tank over the side wall and the closure into the channel. This arrangement, while not preferred, is satisfactory and eliminates a need for forming an opening such as 58 in the side of the containment.

It is noted that panel units 30, 30$^1$ are not restricted to use with the containment unit as disclosed but find use in forming containment units of any desired configuration which function to protect the environment from being soiled with contaminants.

While a preferred embodiment of the invention has been described using specific terms, such description is for illustrative purposes only, and it is to be understood that changes and variations may be made without departing from the spirit or scope of the following claims.

What is claimed:

1. A modular fluid containment system including a plurality of containment units and a plurality of panel units made of flexible non-porous material, said containment units include:
   an operative position in which outer portions thereof are elevated about a base forming walls defining a containment area and an inoperative position in which said outer portions lie flat with said base;
   said panel units include an operative position in which selected opposed outer portions are elevated along opposed sides of a base forming a channel and an inoperative position in which said opposed outer portions lie flat with said base;
   connectors are secured along a selected edge of said containment units and along opposed edges of said panel units, said connectors being inter-engageable forming impervious connections between said panel and said containment units; whereby,
   a plurality of said containment units may be located in selected spaced positions in said operative position, a plurality of said panel units may be inter-connected forming an elongated panel extendable between said containment units, outer ends of said elongated panel may be positioned in said operative position and connected with said containment units forming a containment system over a selected area and said containment and panel units may be disconnected, placed in said inoperative position ready for storage and shipment.

2. The modular fluid containment system of claim 1 wherein said panel units are generally rectangular.

3. The modular fluid containment system of claim 1 wherein selected of said panel units are T or Y-shaped.

4. The modular fluid containment system of claim 1 wherein said plurality of containment units comprises first, second and third units and said elongated panel forms a multi-channel unit connected with each said containment unit.

5. The modular fluid containment system of claim 1 wherein said selected edge of said containment unit includes a channel shaped cutout, said selected edge defining said channel shaped cutout.

6. The modular fluid containment system of claim 1 wherein said connectors comprise tongue and groove connectors.

7. The modular fluid containment system of claim 6 wherein there are a plurality of tracks of said tongue and groove providing plural locking points across each connector.

8. The modular fluid containment system of claim 6 including a control element adapted to engage and separate said tongue and groove elements.

9. The modular fluid containment system of claim 1 wherein said connectors include a first strip carrying a groove element, a second strip carrying a tongue element, one of said first and second strips is connected with opposed ends of said panel unit.

10. The modular fluid containment system of claim 9 wherein said first and second strips are heat sealed with opposed ends of said panel unit.

* * * * *